March 8, 1932. J. C. RYDER 1,849,029
DISTILLATION APPARATUS
Filed Jan. 21, 1924
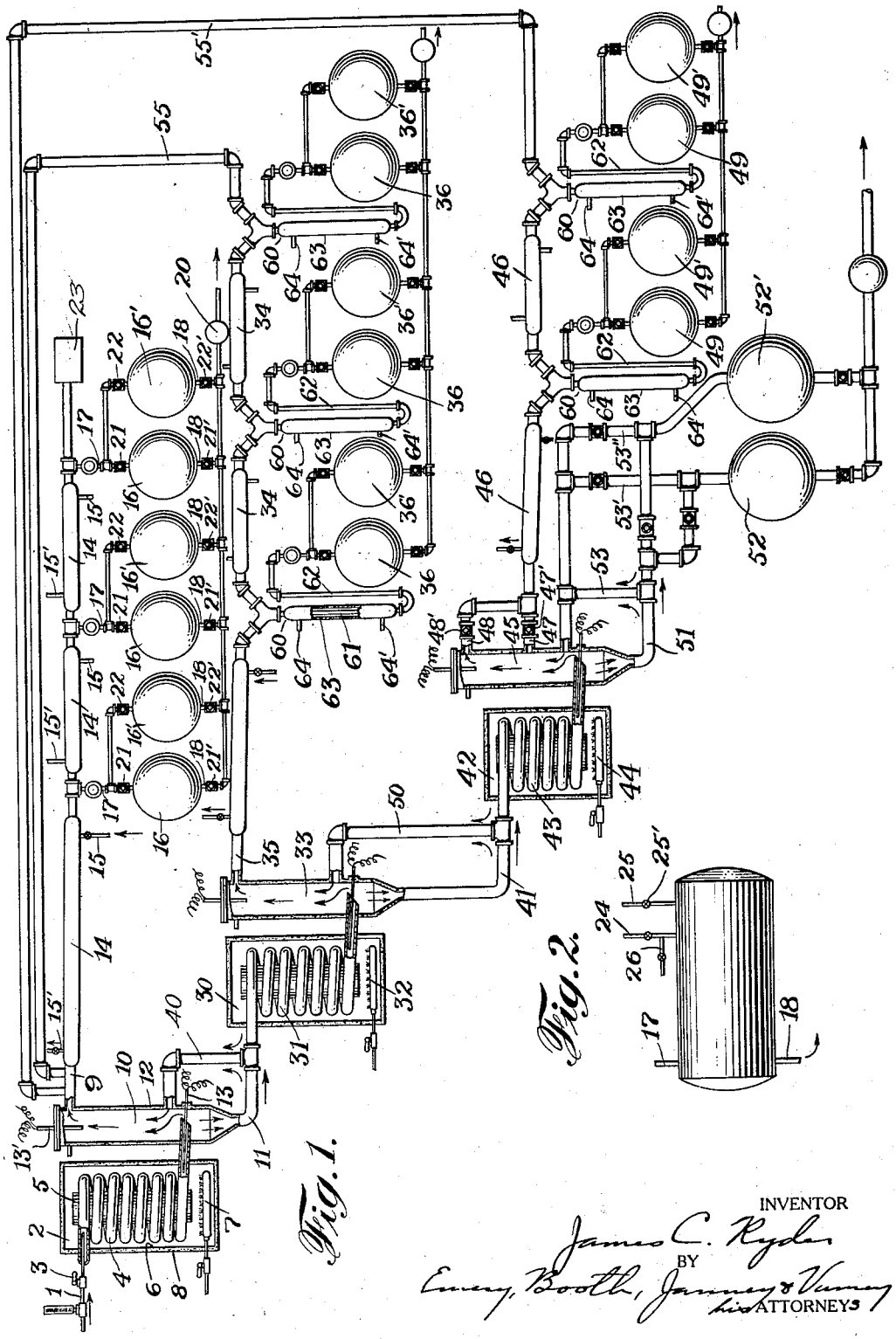

Patented Mar. 8, 1932

1,849,029

UNITED STATES PATENT OFFICE

JAMES C. RYDER, OF PASSAIC, NEW JERSEY, ASSIGNOR, BY MESNE ASSIGNMENTS, TO PETROLEUM DERIVATIVES INCORPORATED, OF NEW YORK, N. Y., A CORPORATION OF MAINE

DISTILLATION APPARATUS

Application filed January 21, 1924. Serial No. 687,470.

This invention relates to the distillation of hydrocarbons and pertains more particularly to apparatus for carrying out such distillation.

It is an object of this invention to provide apparatus for the distillation of hydrocarbons in which decomposition shall be eliminated or reduced to a minimum, in order that the formation of objectionable constituents in the distillates caused by decomposition may be prevented so far as possible, thus making possible the production of heavy, high viscosity lubricants by direct overhead distillation in addition to the usual products obtained.

Other objects and advantages of the invention will appear hereinafter.

This application is filed as a continuation in part of my previously filed application, Serial No. 684,487, filed January 5, 1924, as to all subject matter which is common to the two.

A preferred embodiment of the invention selected for purposes of illustration is shown in the accompanying drawings in which Figure 1 is a semi-diagrammatic side view of an apparatus for carrying out the invention, and Figure 2 is a detail side elevation of one of the receiver tanks.

The hydrocarbons to be treated may be contained in suitable tanks or reservoirs from which they are allowed to flow through the pipe 1 to the still 2 where they are initially subjected to heat. The rate of flow of the oil from the supply tanks is controlled by the valve 3 in the pipe 1, and the oil is preferably allowed to flow at such rate that a stream flows along the bottom of the elongated passage 4 without completely filling the passage in order that the vapors which are evolved by the application of heat may be free to escape at all points on the surface of the stream. The oil flows through the passage due to the force of gravity, the inclination of the pipe being such as to cause the oil to flow freely therein. The passage 4 may consist of various types of elongated passage, it being only necessary to provide adequate surface for the transmission of the required degree of heat and sufficient internal cross-sectional area that the required rate of flow may be maintained without completely filling the passage. In the illustrative embodiment shown, the passage 4 comprises a coil surrounding a baffle 5 and enclosed in a shell 6 the interior of which is heated by a suitable burner 7. The still may, of course, be covered with suitable heat insulating material 8 for economy of heat.

The lower end of the passage 4 leads from the still to a separating tower 10 in which the vapors which have been evolved by the application of heat are allowed to separate from the liquid and from which they are drawn off to suitable condensers. That portion of the liquid stream which remains in a liquid state after the application of heat in the still 2 drops directly to the bottom of the separating tower 10 and into the passage 11. The vapors pass upwardly through the tower and in the course of their upward movement a gravity separation takes place which frees the vapors from any mechanically entrained portions of the liquid which may have been carried along therewith, such liquid portions falling to the bottom of the tower 10 and into passage 11. The separating tower 10 is carefully insulated by suitable heat insulating material 12 to keep the temperatures of the vapors in the tower at approximately the same temperature at which they enter the tower in order that condensation and refluxing may not occur. Thermocouples 13 and 13' are inserted at the entrance and exit to the tower respectively in order that the temperatures of the vapors at these two points may be accurately observed.

The vapors passing upwardly are drawn from the tower through the passage 9 into the jacketed condenser 14 in which they are condensed and allowed to flow as liquids to the distillate receiver tanks.

The condenser may be of any suitable or conventional form, the type described herein comprising a fractionating condenser consisting of three separate sections, each section comprising a jacketed tube, the jacket of which is provided with inlet and outlet openings 15 and 15' respectively through which water or steam may be admitted to the jacket. Each of the sections is preferably maintained at a substantially lower temperature than the preceding section as the gases pass through on their way from the separating tower in order that distillates of different characteristics may be condensed in each section.

Each of the condenser sections is provided with a pair of distillate receiver tanks 16 and 16' which comprise cylindrical tanks of suitable capacity connected to the condenser through the passages 17. The lower side of each of the tanks is provided with a passage 18 through which the distillate may be drawn off to storage tanks. Duplicate distillate receiver tanks are provided in order that when one is filled it may be cut out of the system and the distillate allowed to flow into the other tank. The filled tank may then be emptied by the pump 20 which draws off the oil to storage tanks. Suitable valves 21, 21', 22 and 22' are provided through which the flow of oil to and from the tanks may be controlled.

The passage through the condenser 14 extends beyond the third section of the condenser and is connected to a vacuum pump 23 of any suitable construction. Any type of pump of sufficient capacity to maintain a high degree of vacuum may be used in the system, although ejector type pumps have been found to be particularly well adapted to the type of system described and may be advantageously used therein.

The distillate receivers are also provided with passages 24 through which they may be connected to a vacuum line, not shown, also connected to the vacuum pump 23. The tank 16 is also provided with a passage 25 controlled by valve 25' through which air may be admitted to the tank after it has been cut out of the system in order that the distillate may be removed expeditiously. A branch passage 26 is also provided, connected to the passage 24, through which the tank may be connected to an auxiliary source of exhaust or vacuum in order that the air may be exhausted therefrom before it is cut into the system, the result being that appreciable changes in pressure are avoided when an empty tank is cut into the system.

The passage 11 containing the unvaporized residue from the still 2 leads to the still 30 which in construction and operation is an exact duplicate of the still 2 except for the fact that the passage 31 is of less extent than the passage 4 and consequently a lesser surface is exposed to the heat from the burners 32. It may be noted that due to the drawing off of the vapors from the still 2 the amount of liquid passing to the still 30 is less than that passing to the still 2. Consequently, it is desirable in order that the oils be not too greatly heated that a less amount of heat be absorbed in the still 30. Heat control may also be accomplished, of course, by suitable regulation of the burners 7 and 32, but it has been found desirable to vary the area exposed to heat as well.

The lower end of the passage 31 passes into a separating tower 33 which is similar in construction and operation to the separating tower 10 previously described. The vapors passing into the tower pass upwardly and are separated from mechanically entrained portions of the liquid as in the tower 10 and pass from the tower to the condenser 34 through the passage 35. The condenser 34 consists of three sections similar to those of the condenser 14 previously described, and is provided with three pairs of distillate receivers 36, 36'.

The passage 11 between the stills 2 and 30 is provided with a by-pass 40, the upper end of which leads back into the separating tower 10. It has been found that there is a tendency for some of the vapors in the still 30 to travel backwardly counter to the flow of oil in the passage 31 to the condenser 14. This by-pass 40 has been provided, therefore, to permit a free passage of the vapors without interference with the down-coming stream of oil in the passage 11. The direction which the vapors take in passing from the stills to the condenser is determined by the relative pressure conditions which exist at any given time in the system. The vapors, of course, will flow in the direction of least resistance.

The unvaporized residue from the lower end of the passage 31 flows downwardly through the bottom of the tower 33 into the passage 41 through which it passes to the still 42 which in construction and operation is an exact duplicate of the stills 2 and 30 except for the fact that the passage 43 is of less extent than either the passage 4 or passage 31. A lesser surface is thus exposed to heat from the burner 44 because again, as in the case of the passage 31, a less amount of oil is conducted into the passage.

The lower end of the passage 41 passes into a separating tower 45 which is similar in construction and operation to the separating towers 10 and 33 previously described. The vapors passing into the tower pass upwardly and are separated from mechanically entrained portions of the liquid, as in the tower 10, and pass from the tower to the condenser 46 through the passages 47 and 48 controlled by valves 47' and 48' respectively. The quantity of vapor in the tower determines which of the passages shall be used. If the quantity is small, the passage 47 is opened, while if the quantity is large, the upper passage 48 is used. In the last separating tower of a system as described the quantity of vapor is frequently small, and the use of the lower passage 47 in such cases insures the passage of vapor to the condenser rather than condensation and refluxing within the tower. The condenser 46 consists of a plurality of sections similar to those of the condensers 14 and 34 previously described although two sections have been here deemed sufficient, each section being provided with a pair of distillate receivers 49, 49'.

The passage 41 between the stills 30 and 42 is provided with a by-pass 50, the upper end of which leads back into the separating tower 33, and the operation of which is similar to that described for the by-pass 40.

The residue from the lower end of the passage 43 flows downwardly through the bottom of the tower 45 into the passage 51 through which it passes to residue receivers 52 and 52'. By-passes 53, 53' and 53'' are also provided through which vapors and gases from the residue tank may pass back to the separating tower 45 and thus to the condenser 46.

Even though the utmost precautions are taken it sometimes happens that a small amount of decomposition or cracking will take place within the system described and a certain amount of light vapors are formed thereby in stills 30 and 42 which if allowed to condense in the condenser 34 or the condenser 46 would dilute the distillate condensed in these condensers and would also impart to the distillate an objectionable crack odor. Occasionally, also, small amounts of low boiling point liquids fail to vaporize in the still 2 and are carried on mechanically to the other stills where they are vaporized. For this reason all of the sections of the condensers 34 and 46 are maintained at a temperature sufficiently high to prevent such light vapors from condensing therein, and by-passes 55 and 55' are provided through which such vapors may be carried back to condenser 14 where they may be condensed with other light vapors which were there taken off.

In order to further improve the quality of the distillate it may be desirable also to provide means to prevent the passage of these light vapors into the distillate containers, where, due to the fact that these containers are not heated, they condense and impart an offensive and undesirable odor to the remaining distillate.

As this is a particularly important feature in connection with lubricating oils, the condensers and containers in which it is desired to condense and collect these fractions have been provided with such means, in the embodiment illustrated herein comprising a trap 60. This trap may conveniently be formed in a U shape comprising a pair of legs 61 and 62, one of the legs 61 being connected to the vapor passage and the other leg 62 being connected to the distillate receivers. Provision is made for heating the leg 61 by any suitable means. In the present embodiment, leg 61 is surrounded by a jacket 63 to which may be admitted, through the passages 64, 64', any suitable heated medium.

As the liquid condensed in the condenser flows downwardly into the trap a liquid seal is formed by the distillate which prevents the passage of uncondensed gases into the distillate containers. The leg 61 is maintained, by the heating element provided, at a temperature sufficiently high to prevent the condensation of light vapors therein and also serves to drive off any light vapors which may have previously condensed therein.

The apparatus of this invention is applicable to and useful in the treatment of any of the various crude petroleums in their natural state to distill them into their component fractions, and is further useful in the further distillation of oils such as topped oils which have been subjected previously to a distillation process. The apparatus is also useful in the further treatment of distillates from shale, coal, and similar substances having the characteristics of petroleums.

In operation, the valve 3 is adjusted to control the flow of the oil being treated to cause it to flow at a rate such that a small stream or film of oil is maintained in the bottom of the passages 4, 31 and 43 without completely filling the passages. The heat conditions in the stills 2, 30 and 42 are adjusted in such manner that as the oil flows through the stills it is continuously and progressively heated so that as it flows through the system the degree of heat to which the oil is subjected is continuously increased.

The degree of vacuum maintained in the system by the vacuum pump 23 varies widely depending on the character of the material being treated and on various operating conditions which may be encountered in the operation of the device. In general, it is proposed to maintain what may be called a high vacuum throughout the system, such term being generally applied to absolute pressures of less than 25 mm. of mercury. It is entirely possible, however, and in some cases desirable to operate at a lower vacuum either throughout the system or in a portion thereof, as for instance at absolute pressures of from 25 mm. to 100 mm. of mercury.

As has been set forth before, the evolved vapors are drawn off from the system at intermittent points throughout the course of flow of the stream of oil. It will be apparent, therefore, that the vapors taken off at one point will possess different characteristics and properties from those taken off at other points which have been subjected to different heat conditions, and it is in this manner that the oil treated is separated into its component fractions. It will also be apparent that by adjusting heat conditions between the points at which the vapors are drawn off in the proper manner, fractions, or cuts may be taken off having various desired properties. It is proposed, moreover, to remove the vapors at intervals sufficiently frequent that the temperature range between said points will have little tendency to produce decomposition within the zone therebetween.

The apparatus as described is illustrative of a complete system in which it is desired to use only three still units. It will be readily recognized, however, by those skilled in the art that additional units may be inserted between those here shown and described, all the parts of which would be exact duplicates of the units herein described. The units may be arranged one above another as shown in the illustrative embodiment herein as in a cascade in order that the flow of oil may be by gravity throughout the system, or suitable pumps may be installed to pump the liquid from the bottom of one still to the top of the next.

It will be observed that the system described provides a continuous passage for the flow of oil and vapors from the point at which the oil enters the system to the residue receivers, the vapors being drawn off at intermittent points along the passage through the system. It will also be observed that the vapors are evolved continuously throughout the entire length of the system from all points on the surface of the oil and that immediately the oil reaches a temperature at which it vaporizes, the vapors are released and drawn off leaving only the liquid which requires the additional application of heat for vaporization.

It will also be observed that the distillates collected from stills 30 and 42 condensed in the condensers 34 and 46 will be entirely free of low boiling point constituents due to the by-passing of such low boiling point vapors back to the condenser 14 and also due to the provision of means to prevent such vapors from passing into the distillate receivers.

The products of distillation taken off at the various receivers vary, of course, in their properties depending on the quality of the material being treated and the conditions of operation at any given time. The process and apparatus as described are suitable, however, for operation on various types of crude oils or for the further refining of oils which have already been subjected to a previous distillation, and by determining the proper heat conditions within the stills and within the condensers, the apparatus may be set to produce products of any desired properties. For instance, in treating California crude, gasoline, kerosene and gas oil fractions might be vaporized in the first two stills and fractionally condensed and separated in the sections of the first condenser. Additional gas oil and light lubricants might be vaporized in the second and third stills and fractionally condensed and separated in the sections of the second condenser. Heavy lubricants might be vaporized in the third still and separated into grades in the sections of the third condenser.

Similarly, in treating crudes having a low percentage of light volatiles, such as Goose Creek crude, the temperatures of the units may be readjusted to separate gas oil and whatever light volatiles are present in the first still, various grades of light lubricants may be separated in the second still, and heavy lubricants may be separated in the third still.

It is to be understood that the invention is not limited to the embodiment herein shown for purposes of illustration but that on the contrary it may be variously modified and embodied within the scope of the subjoined claims.

I claim as my invention:

1. In an apparatus for the continuous distillation of liquid hydrocarbons, in combination, a pair of vaporizing units connected in series, means to heat said units, connections permitting flow of liquid from one unit to the other having an outlet opening through which vapors may be removed, and means providing a passage for flow of vapors from the second unit of the series to the said outlet opening.

2. In an apparatus for the distillation of hydrocarbons, in combination, a still, a condenser, a distillate receiver, means comprising a trap in which is formed a liquid seal to prevent the passage of uncondensed vapors into said distillate receiver, and means to heat said trap.

3. In an apparatus for the distillation of hydrocarbons, in combination, a still, a condenser, a distillate receiver, means to maintain said condenser at a predetermined temperature, means comprising a trap in which is formed a liquid seal to prevent the passage of uncondensed vapors into said distillate receiver, and means to maintain said trap at a temperature sufficient to prevent the condensation of light volatiles therein.

4. In an apparatus for the continuous distillation of hydrocarbons, in combination, a source of supply, a residue receiver, a conduit having connection with said source of supply thereof, and with said residue receiver, said conduit comprising a series of stills having connections therebetween, means for heating said stills, said conduit providing a continuous open passage for the unobstructed flow of hydrocarbons in liquid and vapor forms throughout its entire extent, a plurality of condensers and distillate receivers having connections with said conduit for passage of vapors at intervals throughout its extent, means comprising a trap in which is formed a liquid seal to prevent the passage of uncondensed vapors into said distillate receiver, and means to heat said trap.

5. In an apparatus for the continuous distillation of hydrocarbons, in combination, a source of supply, a residue receiver, a conduit having connection with said source of supply thereof and with said residue receiver, said conduit comprising a series of stills having connections therebetween, means for heating said stills, said conduit providing a continuous open passage for the unobstructed flow of hydrocarbons in liquid and vapor forms throughout its entire extent, a plurality of condensers and distillate receivers having connections with said conduit for passage of vapors at intervals throughout its extent, means to maintain said condensers at various predetermined temperatures, means comprising a trap in which is formed a liquid seal to prevent the passage of uncondensed vapors into said distillate receivers, and means for maintaining each trap at a temperature sufficiently high to prevent the condensation of light volatiles therein.

In testimony whereof, I have signed my name to this specification this 17 day of Jan., 1924.

JAMES C. RYDER.